United States Patent Office 3,361,233
Patented Jan. 2, 1968

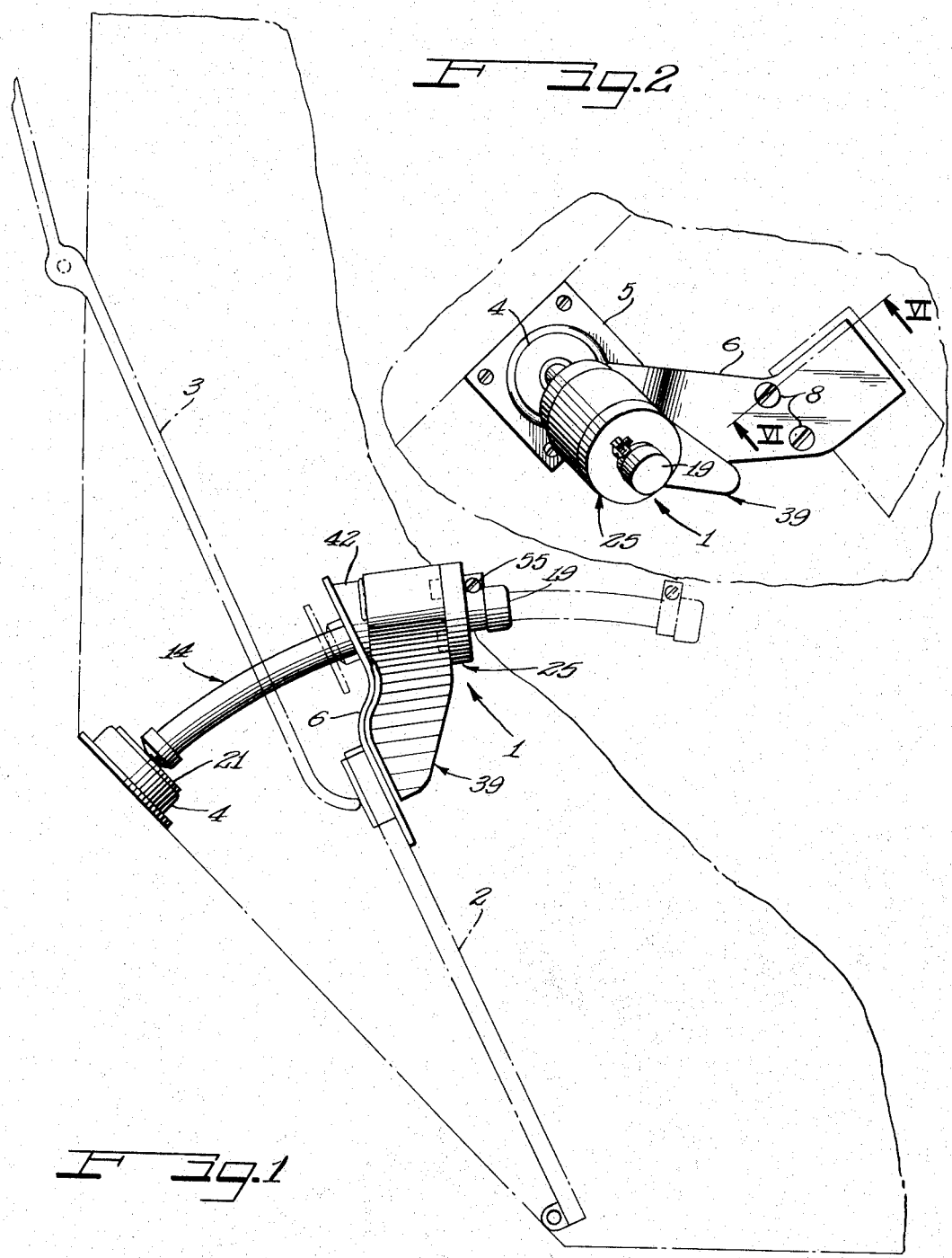

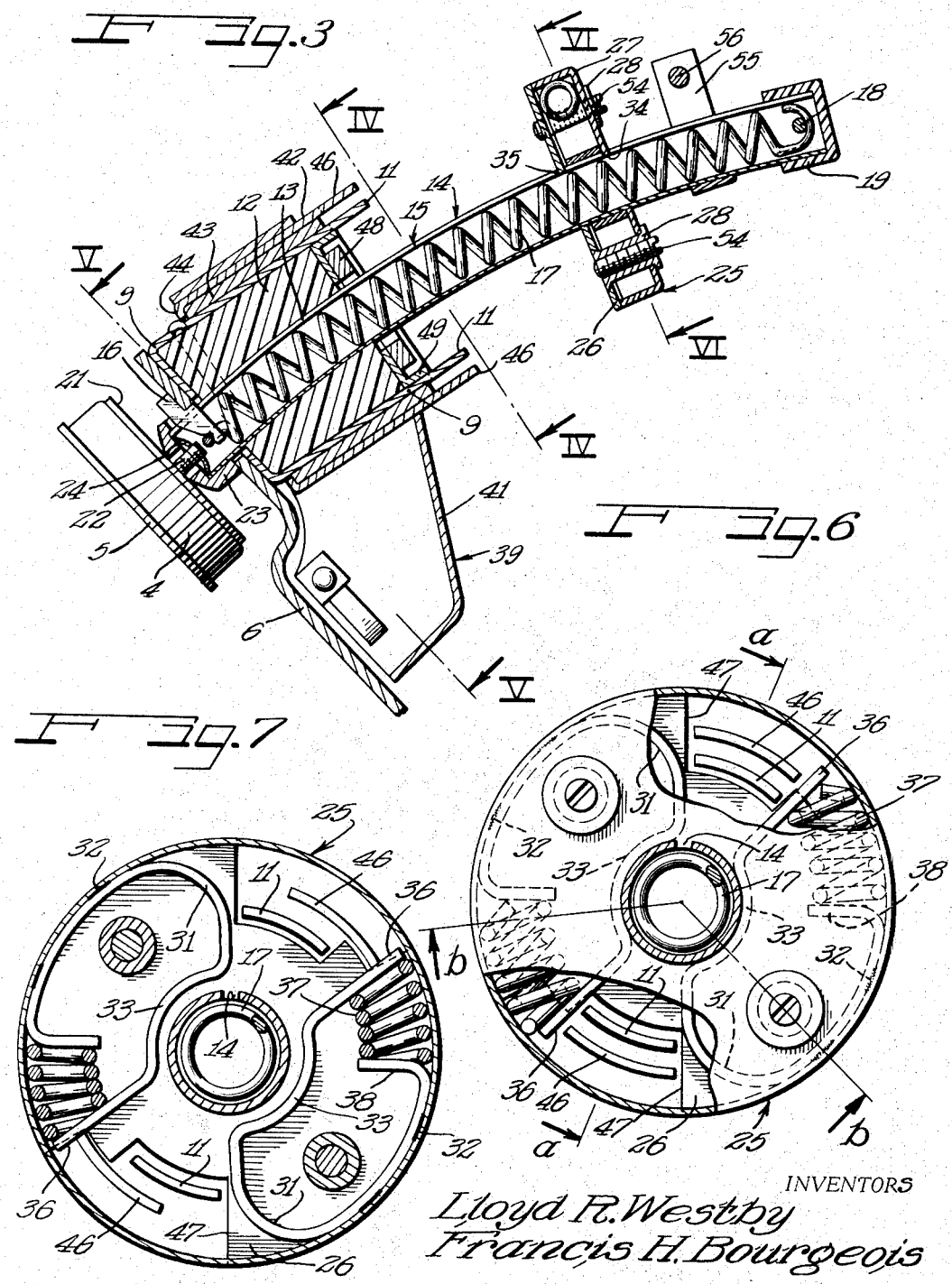

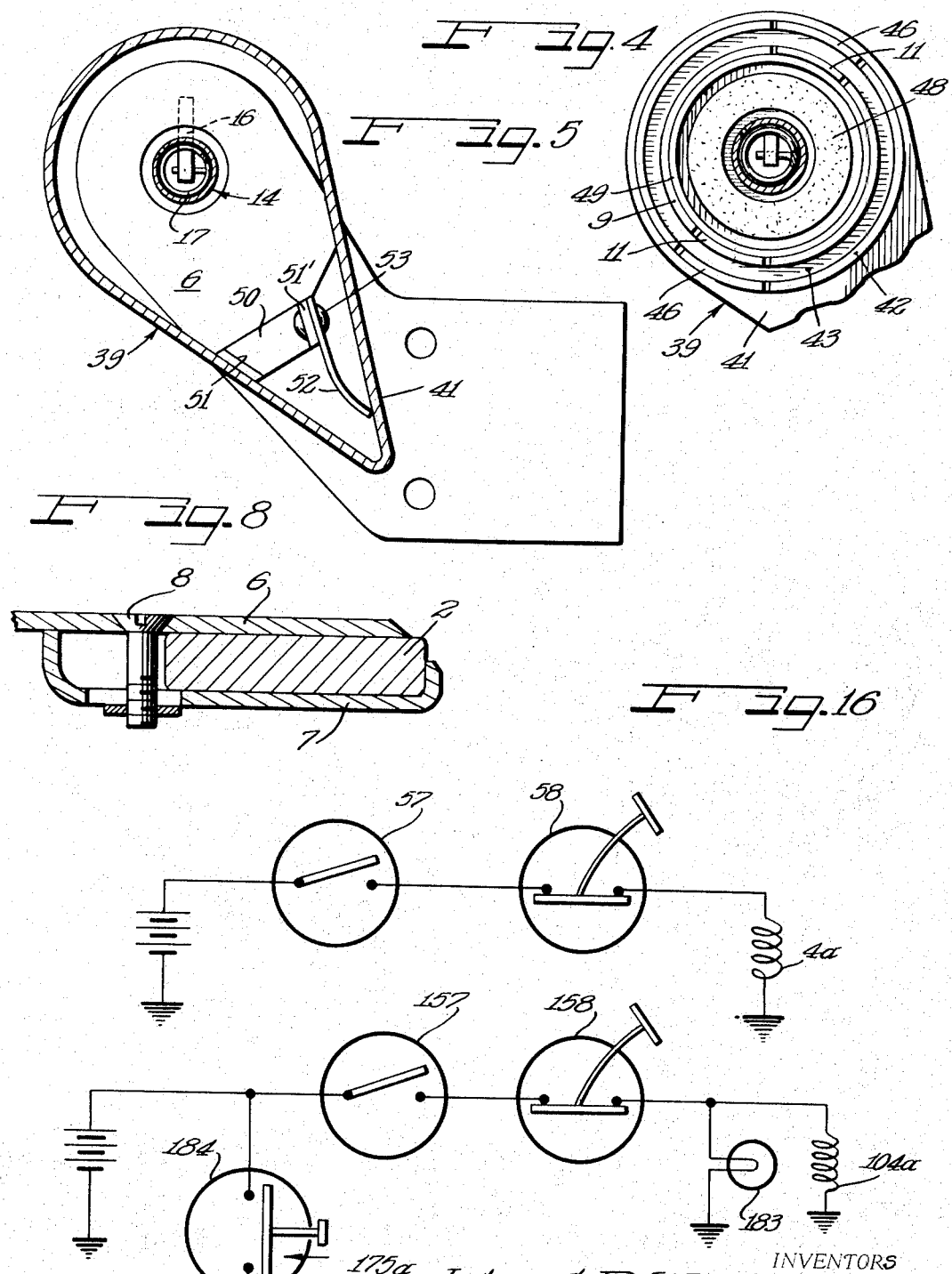

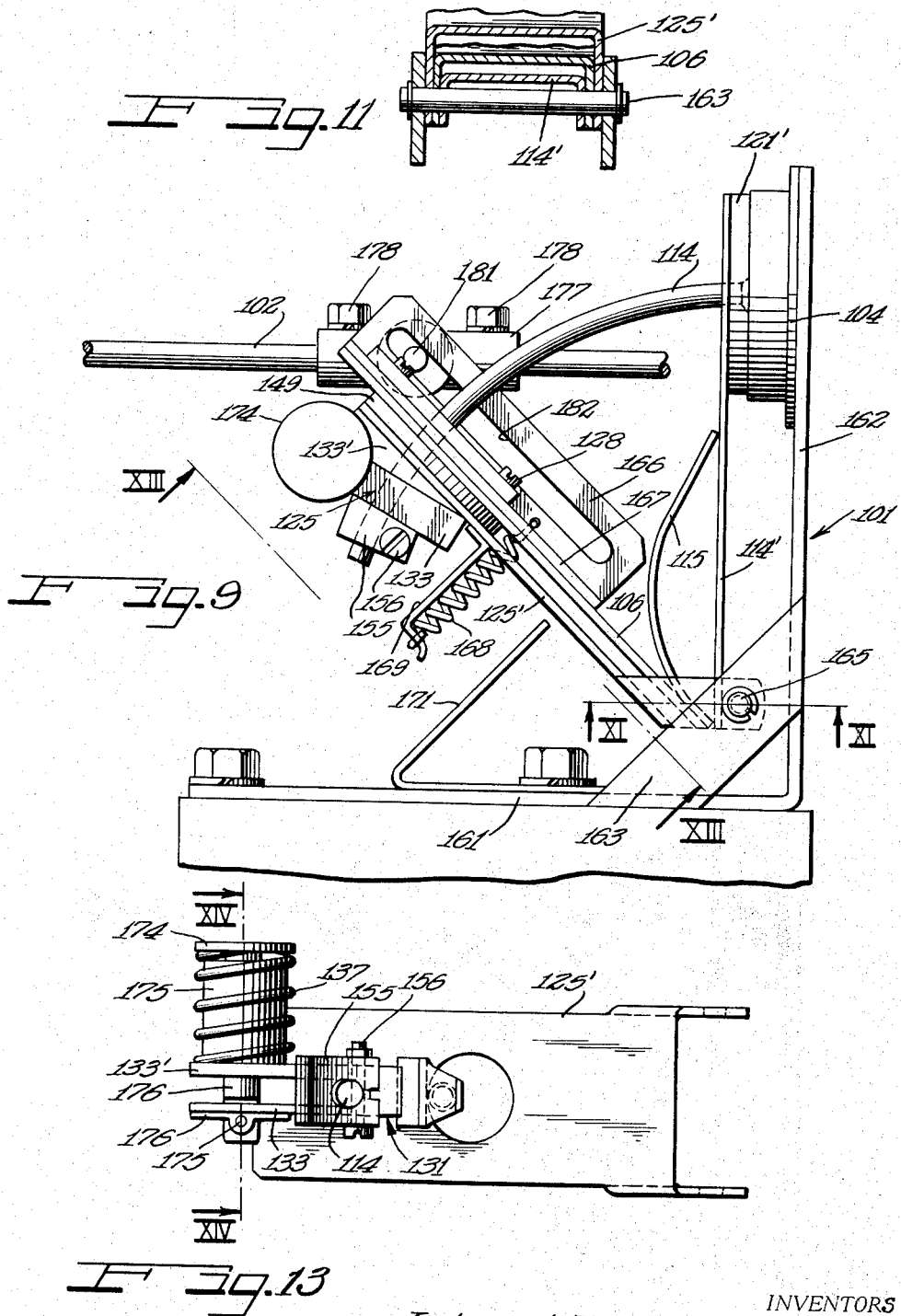

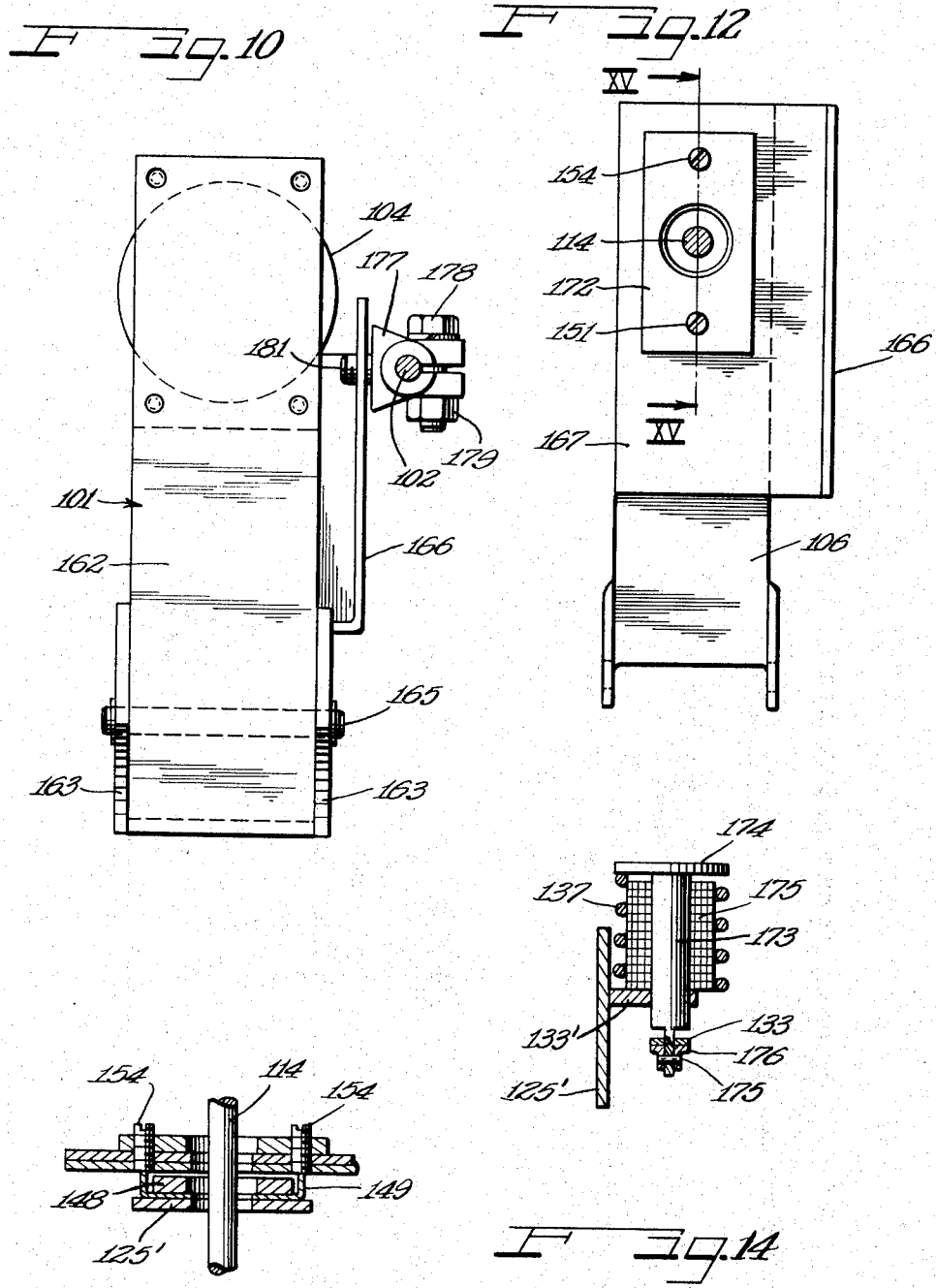

3,361,233
VEHICLE SPEED CONTROL FOR MAINTAINING A PREDETERMINED ACCELERATOR SETTING
Lloyd R. Westby, P.O. Box 233, Wayne, Ill. 60184, and Francis H. Bourgeois, 133 S. Harvey Ave., Oak Park, Ill. 60303
Filed Oct. 7, 1965, Ser. No. 493,841
21 Claims. (Cl. 192—3)

ABSTRACT OF THE DISCLOSURE

A control device adapted to be connected to a movable member for selectively controlling the movement thereof, in which a control member is constructed for operative connection to such a movable member whereby movement of the latter is transmitted to said control member, an element adjustably connectable with the control member, relatively stationary means releasably connectable with said element for retaining the latter in a predetermined position in which control of said movable member may be selectively adjusted by varying the relative connected positions of said element and said control member, releasable means for normally maintaining said element in any of its adjusted positions with respect to said control member, operative upon application of overriding force to said control member to operatively release said element with respect to said control member, and means applying return forces to said element and control member upon cessation of such overriding force.

The disclosure

The invention relates generally to a control device and more particularly to a device for controlling the speed of a motor vehicle, or other equipment having a manually actuatable control member or mechanism.

The invention is especially adapted for use on the accelerator of a motor vehicle, by means of which the driver may adjust the speed to a desired rate, which will be continuously maintained as long as desired. Means is provided to discontinue the operation of the control in the event that braking of the vehicle is required, whereby actuation of the brake pedal will automatically disconnect the speed control. Likewise, the device is so constructed that the driver may override the pre-set speed by applying more pressure to the accelerator and upon release of the overriding pressure the device will return to the pre-set speed.

The invention has among its objects the production of such a control which is relatively exceedingly simple in construction, and which may be designed for direct connection to the accelerator pedal, or other manually actuated element to be controlled, or may be designed for connection to the controlled mechanism at any point where such connection may be effected to a member in the control linkage of the controlled mechanism. In the construction designed for direct attachment to an accelerator pedal only a single unit is mounted on the accelerator pedal and cooperable with a single fixed unit mounted on a stationary part of the vehicle. In the indirect connected construction, a single unit is mounted underneath the hood or other convenient point on the vehicle, where the actuating member of the unit may be operatively connected with the accelerator linkage for actuation by the latter.

Another object of the invention is the production of such a control device which may be easily adjusted to the desired speed setting and in which the control mechanism, when inoperative, will not impede the normal action of the accelerator and accelerator linkage. In the case of the direct mounting to the accelerator pedal when the device is inoperative the accelerator unit is completely free of any connection with other stationary elements and thus the action of the accelerator is substantially exactly the same as it would be if the device were not provided.

Another object of the invention is the production of such a device in which the operation is foolproof particularly with respect to the release of the mechanism in the event it is necessary to brake or slow the car, and in which a memory factor is provided which will insure the return of the control device to its original setting, eliminating any need to reset the mechanism.

A further object of the invention is the production of a control device having the above features in which the override provision results in a clean and comparatively friction-free brake-away, at the same time providing a definite "feel" with respect to the set speed and the action necessary to override the same.

A further object of the invention is the production of such a control device, which is so constructed that the action of the override feature is progressive, requiring less overriding force at low speed settings than at higher speed settings, thereby eliminating the possibility of a sudden undesirable spurt of power at the instant the override takes effect. The action thus is smooth and predictable at all speed settings.

Many other objects and advantages of the present invention will be obvious to those skilled in the art from the disclosure herein given.

In the drawings, wherein like reference characters indicate like or corresponding parts:

FIGURE 1 is a side elevational view of a speed control device embodying the invention designed for mounting on a vehicle accelerator pedal, the latter and a portion of the accelerator linkage being illustrated in broken lines;

FIGURE 2 is a top plan view of the control device illustrated in FIGURE 1;

FIGURE 3 is a longitudinal sectional view through the control structure illustrated in FIGURE 1, the section through the members 9 and 42 being taken approximately on the line $a$—$a$ of FIGURE 6, and the section through the stop member 25 being taken approximately on the line $b$—$b$ of FIGURE 6;

FIGURE 4 is a sectional view taken approximately on the line IV—IV of FIGURE 3;

FIGURE 5 is a sectional view taken approximately on the line V—V of FIGURE 3;

FIGURE 6 is a sectional view of the clutch mechanism, taken approximately on the line VI—VI of FIGURE 3;

FIGURE 7 is a view similar to FIGURE 6 illustrating the clutch mechanism in released position;

FIGURE 8 is a sectional view taken approximately on the line VIII—VIII of FIGURE 2;

FIGURE 9 is a side elevational view of a modification of the invention which is particularly adapted for a vehicle speed control, employing an under-the-hood unit connected to a part of the vehicle accelerator linkage;

FIGURE 10 is an end elevational view of the device illustrated in FIGURE 9;

FIGURE 11 is a sectional view taken approximately on the line XI—XI of FIGURE 9;

FIGURE 12 is a plan view of the control member or arm;

FIGURE 13 is a bottom view of the clutch supporting arm, looking approximately along the line XIII—XIII of FIGURE 9;

FIGURE 14 is a sectional view taken approximately on the line XIV—XIV of FIGURE 13;

FIGURE 15 is a sectional view taken approximately on the line XV—XV of FIGURE 12;

FIGURE 16 is a schematic diagram of the electrical circuit of the construction illustrated in FIGURES 1–8; and FIGURE 17 is a schematic diagram of the electrical circuit of the construction illustrated in FIGURES 9–15.

Two examples of the invention are illustrated in connection with the throttle control of a reactor vehicle, that illustrated in FIGURES 1–8 being constructed for direct mounting on the accelerator pedal of such a vehicle, while the construction illustrated in FIGURES 9–15 is constructed as a unitary assembly which may be disposed at any convenient location which will provide access to a portion of the accelerator linkage of the vehicle to permit connection of the latter to the control mechanism.

*Manual unit*

The construction illustrated in FIGURES 1–8 comprise two units, one of which is mounted on the accelerator pedal and the other of which is mounted on a stationary part of the vehicle such as the floor board, bulkhead or the like.

Referring to FIGURE 1, the reference numeral 1 indicates the pedal assembly adapted to be mounted on an accelerator pedal 2, illustrated in broken lines, which in turn is adapted to actuate the accelerator linkage which is represented as including a lever 3, also illustrated in broken lines. Mounted on the floor board or other stationary portion of the vehicle is an electromagnet assembly 4, which as illustrated in FIGURE 2, may be suitably mounted to the floor board, for example, by screws passing through openings in the base plate 5 of the magnet assembly. As generally illustrated in FIGURES 1 to 5, the unit 1 comprises a base member 6 which is adapted to be mounted on the pedal 2 by suitable means such as a clamp member 7 and screws 8 and cooperable nuts, the vehicle 7 being slotted to provide adjustment for pedals of different widths. Mounted on the member 6, which will hereinafter be designated as the control member, is a cup-shaped member 9, rigidly secured to the member 6 by welding or other suitable means and terminating at its upper end in a pair of prongs 11. As illustrated in FIGURE 3, the cup member 9 encloses a plastic insert 12 which has an arcuate-shaped bore 13 therein, in which is slidably mounted a hollow tube 14 having an arcuate axis. The tube 14 is provided with a longitudinally extending slot 15, the member 6 carrying a projection 16 which extends into the slot 15 and forms an anchor for one end of a spring 17 disposed within the tube 14, the opposite end of the spring being anchored at the other end of the tube by means of a suitable pin 18. The adjacent end of the tube is closed by suitable means such as a plastic cap member 19 which is frictionally attached to the tube. Provided at the end of the tube 14, adjacent the projection 16, is an armature 21 which is cooperable with the electromagnet 4, the armature being provided with a cylindrical stem 22 which extends through a semi-spherical cap member 23 rigidly attached to the adjacent end of the tube 14, the armature being loosely secured to the cap 23 by a spring nut 24 or other suitable means attached to the stem 22.

The spring 15 normally urges the tube 14 to the left, as viewed in FIGURE 3, to the approximate position illustrated in FIGURE 1. Such movement of the rod 14 is adapted to be adjustably restricted by a stop member 25 which is adapted to be adjustably disposed along the tube 14 and rigidly locked in any adjusted position by means of a suitable clutch assembly carried thereby.

The stop member 25 consists of an armature plate 26 and a cup-shaped housing 27, which are illustrated as being secured in assembly relation by a pair of hollow rivets 28. Disposed within the housing and secured to the side wall 29 thereof are a pair of generally C-shaped springs 31 which are of similar shape and disposed in reversed positions within the housing, such springs, in the construction illustrated, being suitably secured as indicated at 32 to the housing side wall and having arcuate-shaped intermediate portions 33 which are adapted to bear on the tube 14. Rotation of the stop member 25 with respect to the tube is prevented by inwardly directed tongues 34 and 35, respectively, disposed on the housing member 27 and the armature plate 26, such projections extending into the slot 15 of the tube. The free ends 36 of the respective clutch springs extend radially outward to adjacent the housing side wall and are urged, by compression spring 37, in a direction to exert pressure on the tube 14 by the intermediate portion 33, one end of which bears on the adjacent portion 36 of the associated spring and the opposite end on the inturned portion 38 at the opposite end of the associated clutch spring 31.

The clutch mechanism is adapted to be actuated through a manually operated lever or arm 39 which has a generally hollow triangular-shaped manually engageable portion 41, the arm 39 encircling the annular-shaped member 42 and rigidly connected therewith. Surrounding the cup-shaped member 9 and secured thereto, for example by means of a press fit, is a tubular member 43 forming a bearing surface for the member 42 which is adapted to be rotated relative to the member 43 and the member 9. Axial movement of the member 42 and thus the member 41 is suitably prevented, as for example, by forming an inwardly directed flange 44 on the lower end of the member 42 which engages the adjacent end of the tubular member 43, and therefore restricts movement of the member 44 in an upward direction. Movement in the opposite direction is prevented by suitable means such as a bead 45 formed on the member 9 at the opposite side of the flange 44.

The member 42 is provided with a pair of outwardly extending prongs 46 which are generally similar to the prongs 11 on the member 9, the prongs 11 and 46 being of a size to pass through the openings 47 in the armature plate 26 and disposed adjacent the radially extending portions 36 and the respective clutch springs 31.

Cooperable with the armature plate 26 is a magnet assembly comprising an annular-shaped magnet 48 and cup-shaped member 49 which are rigidly secured to the member 9 by suitable means. Thus, assuming the armature 21 is not disposed adjacent the electromagnet 4, the spring 15 will endeavor to draw the tube 14 toward the spring anchor 16, to a position corresponding generally to that illustrated in FIGURE 1, with armature 26 cooperably engaging the magnet assembly comprising the magnet 48 and member 49. The prongs 11 and 46 will then extend through the openings 47 in the armature plate into the clutch housing where they are disposed adjacent the radially extending portion 36 of the spring 31, as illustrated in FIGURES 6 and 7. If the actuating member 39 is now rotated about its pivotal axis in a clockwise direction, as indicated by the arrows in FIGURE 5, the prongs 46 will engage the adjacent ends of the clutch springs, moving them in a direction to release the intermediate portions 33 from the tube and thus releasing the clutch assembly from its locking engagement with the tube. As illustrated in FIGURE 7, the prongs 11 form a stop against which the respective portions 38 of the springs may seat, relieving the tube 14 of any excessive torsion stresses during the adjusting operations.

When the clutch springs are in such released position the tube 14 may be freely adjusted with respect to the clutch assembly and the member 6, either by action of the spring 15 which would tend to move the tube 14 to the left as viewed in FIGURE 3, or by applying pressure on the end face of the armature 21 (by application of pressure on the accelerator pedal 2), tending to move the tube to the right as viewed in FIGURE 3.

When the tube 14 is in a desired position, the clutch assembly 25 may be rigidly locked to the tube by releasing the lever 39 and thus the ends of the springs 36. To supplement the action of the springs 36 to return the projection 46 and thus the actuating lever 39 to its original position, additional spring means may be provided between the control member 6 and the lever 39, such means in the embodiment illustrated comprising a bracket 50, particularly illustrated in FIGURE 5, which is mounted on the control member 6 and provided with two upstanding ears 51 and 51', the ear 51 forming a stop for limiting the movement of the actuating arm in a counterclockwise direction, as viewed in FIGURE 5, and the ear 51' providing means for supporting a leaf spring 52 which is operative to bear on the adjacent portion of the actuating arm 39 and urge the latter in a counterclockwise direction, the spring 52 being secured to the ear 51' by any suitable means such as a rivet 53.

Suitable means may also be provided for adjusting the action of the armature 26 with respect to the magnet assembly 48–49 which, in the embodiment illustrated, consists of a pair of adjusting screws 54 which are conveniently threaded into the hollow rivets 28, the latter being so disposed radially that the screws 54 may bear on the adjacent edge of the member 49 and thus provide an adjustment of the magnetic gap between the magnet assembly and the armature 26.

Movement of the clutch assembly toward the cap 19 on the adjacent end of the tube 14 may be restricted by suitable means such as a clamp member 55 which encircles the tube 14 and is adapted to be clamped in position by a screw 56 and cooperable nut.

*Operation*

In use on a vehicle, the assembly 1 is attached to the accelerator pedal 2 as illustrated in FIGURE 8, and following the mounting thereof, the electromagnet 4 is suitably mounted, for example in the form illustrated in FIGURE 1, on the floorboard of the vehicle, with the magnet centered on the axis of the tube 14 so that the armature 21 will engage the electromagnet as illustrated in FIGURES 1, 2 and 3.

FIGURE 16 illustrates the electrical circuit for the construction of FIGURES 1–8, and as illustrated, the winding 4a of the electromagnet 4 is adapted to be operatively connected to the car battery in series with an on-off switch 57 and a brake actuated switch 58, the switch 58 being operative to break the electrical circuit to the magnet winding 4a when the brake pedal is actuated. This switch could take the form of a hydraulically actuated, normally closed switch, which could be incorporated into the standard stoplight switch or could be a suitably arranged mechanical switch whereby movement of the brake pedal would actuate the same.

In utilizing the device the operator has a choice of operation. If desired, he may employ the device merely to provide a limiting action on the accelerator which will indicate when a desired speed has been reached and in which additional pressure must be applied to the accelerator if such set speed is to be overridden. For this type of operation the driver merely actuates the lever 39 with his toe to release the clutch assembly 25 and while the clutch is so released applies pressure to the accelerator until he has reached the desired speed following which the actuating lever 39 is released, locking the clutch assembly 25 to the tube 14. With the device so set, the driver may move the accelerator downwardly in the usual manner, without any impedance from the control mechanism, until the armature 21 engages the electromagnet 4, which in this mode of operation is not actuated and thus has no effect on the armature other than to form a stop therefor. When this condition is reached the accelerator pedal will be restricted as to further downward movement unless sufficient force is applied to the pedal to overcome the magnetic attraction between the armature 26 and the magnet assembly 48–49 as well as the force of the spring 15. When such overriding force is applied, the accelerator may then be moved downwardly to the full extent of its travel, with the ultimate position then approaching that illustrated in FIGURE 3. Upon release of such overriding pressure, the accelerator will move upwardly with the spring 15 returning the tube 14 and armature 26 to its original position generally corresponding to that illustrated in FIG. 1.

It will be particularly noted that during this operation the assembly 1 is merely carried by the accelerator pedal with no frictional lag or other impediment with respect to the accelerator movement being present other than the fact that the addition of the device to the accelerator pedal has added a small amount of weight thereon, which normally will be inconsequential. Likewise, it will be noted that there is no frictional or other retarding forces that would prevent the accelerator pedal from returning to its slow speed position.

If the driver desires to change the speed setting it is merely necessary to actuate the lever 39, releasing the clutch and permitting the tube 14 to move to a position which will give the desired speed setting.

To prevent operation of the control at extremely low speeds, and thus prevent movement of the clutch assembly 25 to the right as viewed in FIGURE 3, beyond a predetermined setting, the clamp 55 may be positioned along the tube 14 at any desired point which will give a desired minimum operating speed at which the control will become effective. This adjustment will normally be made at the time of installation and is likewise very simply made by merely taking the car on the road and adjusting the control for the desired minimum speed at which it is to be operative, adjusting the armature 26 accordingly, following which the clamp 55 may be adjusted to prevent the clutch assembly from moving further to the right as illustrated in FIGURE 3. Normally such setting would be at approximately fifteen to twenty miles an hour.

For highway or tollway driving, at which a constant speed is to be maintained, the driver merely actuates the switch 57, illustrated in the circuit of FIGURE 16, and as the switch 58 will normally be closed, the winding 4a of the electromagnet 4 will be energized. With such conditions existing, the driver merely releases the actuating lever 39, as previously described, and advances the accelerator until the desired cruising speed is reached, at which point the actuating lever 39 is released, locking the clutch assembly to the tube 14. However, as the armature 21 is now attracted to the electromagnet 4, the clutch pedal will be retained in the position so set and the car will thus maintain the cruising speed as thereby determined. If it becomes necessary to brake or slow the car, the accelerator is instantly released by a touch of the brake pedal which will effect an opening of the switch 58, breaking the circuit to the electromagnet and releasing the armature 21, permitting the accelerator to return to its normal minimum position. Upon resumption of speed, the memory factor again takes over as soon as the accelerator is depressed to the preset speed, at which point the armature 21 re-engages the electromagnet 4, the latter having been re-energized as soon as the brake pedal was released.

It will be particularly noted that with this construction upon deenergization of the electromagnet 4, other than the additional weight of the device mounted on the accelerator pedal, there remains no friction or other added losses which would retard the return of the accelerator pedal, the latter being just as free as it was prior to the attachment of the control device thereon.

It will also be noted that the force necessary to override a speed setting becomes progressively greater with higher speed settings, as the spring 14 will be under greater tension at the high settings than at the low. Consequently, at the low settings the override will take place without any tendency for the accelerator to jump, with the possibility of too rapid an acceleration of the vehicle. At the higher speeds flooring the accelerator would have considerably less effect in this regard.

The switch 57 may be of any sutiable type and may be constructed for mounting on the floorboard of the vehicle for foot control, for mounting on the dash for hand control, or may be suitably actuated by lever means from the steering column, etc.

*Universal unit*

The embodiment of the invention illustrated in FIGURES 9 to 15 is generally similar to the construction illustrated in FIGURES 1 to 8 as to general functions involved, but is designed for universal mounting at any desirable location where, in the case of a vehicle, the accelerator linkage is accessible for connection to the unit. Thus, in this embodiment, which may be constructed in the form of a relatively small rectangular-shaped housing, which contains all of the operating parts, the unit may be mounted either under the dash or under the hood, with the device being rigidly mounted on a suitable stationary portion of the vehicle. Means is provided for connecting the device to the accelerator linkage and in general the operation will be identical to that heretofore described, with the exception that as the unit will normally be disposed at a location which will not permit manual actuation of the clutch mechanism, electromagnetic means is provided for effecting the desired adjustment. It might be mentioned that while the device normally would be wholly contained within a suitable housing, such a housing is not illustrated in the drawings as it may be of any suitable construction and is not involved in the operation of the device.

Referring to FIGURES 9 and 10, in which parts corresponding to those of FIGURES 1 through 8 will be designated by corresponding reference characters having a prefix of 100, the reference numeral 101 designates a base member which is of general L-shape having a horizontally extending portion 161 and an upwardly extending portion 162 provided adjacent the corner thereof with diagonally extending brace members 163 which form a journal for a pin 165. Pivotally mounted on the pin 165 is a control arm 106, an armature supporting rod 114' and an electromagnetic clutch supporting arm 125', which as illustrated in FIGURE 11, are nested on the pin 165, the latter being secured in position by suitable retaining lock rings.

Carried by the control member 106 is a slotted flange 166, which is a separate piece having a laterally extending portion 167 which is suitably attached by welding or otherwise to the control member 106. Carried by the member 114' is an armature 121' cooperable with an electromagnet 104 mounted on the member 162 of the base 101, the member 114' also carrying an arcuate rod 114 which extends through openings in the control member 106 and the member 125'. The armature supporting arm 114' is urged in a separating direction with respect to the control member 106 by a leaf spring 115 suitably secured to the control member 106. In like manner the control member 106 and clutch supporting arm 125' are urged toward one another by a coiled tension spring 168, one end of which is hooked upon a portion of the control member 106, and the opposite end upon a spring bracket 169.

Mounted on the arm 125' is a magnet assembly comprising a magnet 148 and cup-shaped retainer 149 adapted to engage and attract the control member 106 which functions as the armature for the permanent magnet assembly. The magnetic gap may be adjusted by screws 154 which are threaded into a small rectangular plate 172 welded or otherwise attached to the control member 106.

Also carried by the arm 125' is the clutch assembly 125, which comprises a generally U-shaped clutch member or clamp 131 having oppositely disposed leg portions 133 and 133', the latter being of greater width than the former and providing means for mounting the clutch member to the arm 125' as illustrated in FIGURE 14, the arm 133' being suitably secured to the arm by welding or other means. The means for actuating the clutch comprises a plunger 173 having an armature disc 174 at one end thereof and connected at its opposite end by a pin 175 to a bracket 176 which is attached to the member 133. A spring 137 bearing at one end on the armature 174 and at the other end on the member 133', thereby urges the portions 133 and 133' toward one another, applying clamping forces to the rod 114. However, upon energization of a solenoid winding 175 encircling the plungers 173, the armature 174 will be drawn toward the solenoid winding, thereby moving the plunger 173 in a direction to spread the clutch members 133 and 133', releasing the rod 114. Movement of the clutch assembly 125 toward the adjacent free end of the rod 114 is retricted by a suitable clamp member 155 which is secured in place by a screw 156.

The mechanism is adapted to be connected to a movable member to be controlled, as for example, the accelerator rod linkage 102 by means of a bracket member 177 which is in the form of a clamp member encircling the accelerator rod 102 and clamped thereto by means of a bolt 178 and nut 179, the bracket 177 having a laterally extending pin 181 which is disposed in an elongated slot 182 in the flange 166 of the control member 106. Thus, as the rod 102 is moved longitudinally, for example, toward the right as viewed in FIGURE 9, the control member 106 will be pivoted in a clockwise direction about the pin 165, the control member thus following the movement of the rod 102.

*Operation*

The device will normally be mounted in a manner similar to that illustrated in FIGURE 9 which shows the horizontal leg 161 of the base member 101 as being attached to a stationary portion of the vehicle by means of a pair of bolts, with the bracket 177 being suitably adjusted so that when the device is in the position illustrated in FIGURE 9, the accelerator pedal and linkage will be in the low throttle position, the rod 102 moving to the right as viewed in FIGURE 9 toward an advancing position. If advancing movement of the rod 102 was in the opposite direction the control mechanism would be reversed from left to the right to that shown in FIGURE 9.

As illustrated in FIGURE 17, the general circuit of this embodiment of the invention is similar to that illustrated in FIGURE 16, employing an on-off switch 157 and a brake control switch 158, which are in series with the solenoid winding 104a of the solenoid 104. As illustrated, if desired, a suitable indicating light 183 may be provided connected in parallel with the winding 104a to indicate that the winding is energized. In addition to such circuit, this embodiment also includes an additional circuit comprising a normally closed push button switch 184 which is in series with the battery and the winding 175a of the solenoid 175.

The operation of this embodiment is generally similar to that heretofore described with respect to the embodiment of FIGURES 1–8, with the exception that adjustment of the speed setting is accomplished by actuating the push button switch 184 to energize the solenoid winding 175a, thus causing the clutch 125 to release from the rod 114 and thereby permit adjustment of the arm 125', clutch 125 and magnet assembly 148–149 with respect to the rod 114, following which the switch 184 is released, thereby permitting the clutch 125 to rigidly lock the arm 125' to the rod 114.

Actual operation of the device insofar as the accelerator pedal is concerned is the same as that heretofore described, and either a speed setting may be effected, or a cruise setting may be utilized to energize the magnet 104 and thus maintain the speed of the vehicle at the desired setting. As in the previous construction, actuation of the brake pedal will open switch 158 and thus break the circuit to the electromagnet 104 releasing the accelerator to its low throttle position.

While this embodiment of the invention involves an element which is continuously connected to the accelerator linkage, the arrangement involving only pivotal movement of the members introduces very little frictional or other leg introduced into the system. The clamp 155 serves the same function in this embodiment as in the previous, permitting the adjustment of a low speed setting, below which the device is inoperative.

It will be noted that in this construction, as in the construction of FIGURES 1–8, a progressive override action is achieved, the spring 115 being increasingly tensioned at the higher speed settings, whereby greater override force is required as compared with the low speed settings.

It will be appreciated from the above description that both forms of construction enable the drive to determine a desired speed or limit at which the moment the accelerator, with an average amount of pressure thereon, will come to a stop, following which an additional pressure is necessary to override the setting, the control device, however, returning to the preset speed as soon as the accelerator is returned to that position.

Further, if the operator desires, the device may be set for cruise operation by actuating the switch 157 whereupon the accelerator, following depression to the set speed, will remain thereat upon release of pressure on the accelerator and continue to remain at such set speed until the brake pedal is actuated, whereupon the accelerator will be released and returned to its low throttle position. When it is desired to resume the set speed, the accelerator is merely depressed to the desired point, and will thereafter be retained thereat.

It will be appreciated that, in the construction illustrated in FIGURES 9 through 15, the switch 184 for effecting adjustment of the setting of the device could be arranged to be operated from the accelerator, either by suitably mounting the switch directly on the accelerator or by providing mechanical linkage on the accelerator which will actuate such a switch. Likewise, the switch could be operated from the dashboard or could be incorporated in a suitable steering column control, for example, in combination with the switch 158.

As previously mentioned, the embodiment of FIGURES 9 to 15 is preferably provided with a suitable housing which is merely formed with a slot in the side wall adjacent the flange 166 of a size to permit free movement of the pin 181. Similarly, the switch 157 could be mounted on the floor board or other suitable location for actuation with the foot.

It will be noted from the above description that we have provided a relatively simple yet highly efficient mechanism for achieving the desired result, which may be constructed for direct application to an accelerator pedal or the like, or of universal construction that may be disposed wherever the member to be controlled is accessible for connection.

It will also be appreciated from the above disclosure that we have provided a mechanism which is not limited to automotive vehicles or the like but is applicable to substantially any movable member which is to be controlled, the controlling functions of which are comparable to those here involved, namely, where a limiting setting is to be provided which can be overridden when desired and in which release of a continuous operation may be effected through actuation of another control member of the device being controlled.

Having thus described our invention, it will be obvious to those skilled in the art from the disclosure herein given that various immaterial modifications may be made in the same without departing from the spirit of our invention; hence we do not wish to be understood as limiting ourselves to the exact form, construction, arrangement and combination of parts herein shown and described, and more particularly pointed out in the claims.

We claim:

1. In a control device which is to be connected to a movable member for selectively controlling the movement thereof, the combination of a control member constructed for operative connection to such a movable member whereby movement of the latter is transmitted to said control member, a relatively stationary member, electromagnetic means carried by said stationary member, an armature cooperable with said electromagnetic means, means for adjustably guiding said armature relative to said control member, releasable means for normally maintaining said armature in any of its adjusted positions with respect to said control member, operative upon the application of overriding force to said control member to operatively release said armature with respect to said control member, and means effecting a return of said armature means upon cessation of such overriding force.

2. In a control device which is to be connected to a movable member for selectively controlling the movement thereof, the combination of a control member constructed for operative connection to such a movable member whereby movement of the latter is transmitted to said control member, a relatively stationary member, means carried by said stationary member releasably engageable with an element adjustably connectable to said control member, means for adjustably guiding said element relative to said control member, magnetic means for normally maintaining said element in any of its adjusted positions with respect to said control member, operative upon the application of overriding force to said control member to operatively release said element with respect to said control member, and means effecting a return of said element upon cessation of such overriding force.

3. In a control device which is to be connected to a movable member for selectively controlling the movement thereof, the combination of a control member constructed for operative connection to such a movable member whereby movement of the latter is transmitted to said control member, a relatively stationary member, means carried by said stationary member releasably engageable with an element adjustably connectable to said control member, means for adjustably guiding said element relative to said control member, releasable means for normally maintaining said element in any of its adjusted positions with respect to said control member, operative upon the application of overriding force to said control member to operatively release said element with respect to said control member, and means effecting a return of said element upon cessation of such overriding force.

4. A control device as defined in claim 3 for controlling the speed of a vehicle having a speed controlling accelerator system wherein said control member is attached to a member forming a part of said system, and means operatively connected with the vehicle brake system operative to effect a release of said element from the stationary member when said brake system is actuated.

5. In a control device which is to be connected to a movable member for selectively controlling the movement thereof, the combination of a control member constructed for operative connection to such a movable member whereby movement of the latter is transmitted to said control member, a relatively stationary member, electromagnetic means carried by said stationary member, an armature cooperable with said electromagnetic means, means for adjustably guiding said armature relative to said control member, magnetic means for normally maintaining said armature in any of its adjusted positions with respect to said control member, operative upon the application of overriding force to said control member to release said armature with respect to said control member, and means effecting a return of said armature with respect to said magnetic means upon cessation of such overriding force.

6. In a control device which is to be connected to a movable member for selectively controlling the movement thereof, the combination a control member, means for operatively connecting said member to such movable member whereby said control member is movable therewith, an electromagnet, having means for mounting the same on a member which is stationary, an arcuate member being slidably mounted on said control member for axial movement relative thereto, an armature carried at one end of said arcuate member, the latter being disposed to position said armature for operative engagement with said electromagnetic, spring means operative to bias said arcuate member relative to said control member in a direction to bias said armature toward its magnet engaging position, permanent magnet means carried by said control member, a second armature cooperable with said permanent member, and movable along said arcuate member, clutch means operatively carried by said second armature for releasably rigidly locking said armature to said arcuate member, whereby said armature is operative to restrict movement of said arcuate member and first armature toward said electromagnet, and a movable operating member carried by said control member, having means connected therewith for effecting release of said clutch means to permit movement of said arcuate member relative to said control member responsive to action of said spring means, said permanent magnet and second armature being separable upon the application of separating force therebetween greater than the magnetic attraction therebetween and the action of said spring.

7. A control device which is to be connected to a vehicle accelerator for selectively controlling the movement thereof, comprising a control member having means therein for attaching the same to such an accelerator whereby movement of the latter is transmitted to said control member, a relatively stationary member having means thereon for attaching the same to a stationary part of the vehicle, electromagnetic means carried by said stationary member, an armature cooperable with said electromagnetic means, means for adjustably guiding said armature relative to said control member, means for normally maintaining said armature in any of its adjusted positions with respect to said control member, operative upon the application of overriding force to said control member to release said armature with respect to said control member, and means effecting a return of said armature with respect to said magnetic means upon cessation of such overriding force.

8. A control device as defined in claim 7 wherein said magnetic means comprises electromagnetic means.

9. A control device as defined in claim 7 wherein said magnetic means comprises permanent magnet means.

10. A control device as claimed in claim 7 wherein said adjustable means comprises a mechanical clutch mechanism having a manually actuatable actuating element.

11. In a control device which is to be connected to a movable member for selectively controlling the movement thereof, the combination of a control member, means for operatively connecting said control member to such movable member whereby said control member is movable therewith, an electromagnet, having means for mounting the same on a member which is stationary, a hollow tube having an arcuate axis slidably mounted on said control member for axial movement relatively thereto, an armature carried at one end of said tube, said tube being disposed to position said armature for operative engagement with said electromagnet, spring means disposed in said tube, operative to bias said tube relative to said control member in a direction to bias said armature toward its magnet engaging position, permanent magnet means carried by said control member, a second armature cooperable with said permanent magnet means and movable along said tube, clutch means operatively carried by said second armature for releasably rigidly locking said armature to said tube, whereby said armature is operative to restrict movement of said tube and first armature toward said electromagnet, and a movable operating member carried by said control member, having means connected therewith for effecting release of said clutch means when said second armature is adjacent said permanent magnet to permit movement of said tube relative to said control member responsive to action of said spring, said permanent magnet and second armature being separable upon the application of separating force therebetween greater than the magnetic attraction therebetween and the action of said spring.

12. A control device as defined in claim 11, wherein said clutch means comprises a resilient clutch member releasably engageable with said tube, said movable operating member being engageable with said clutch member and operable to move the latter out of locking engagement with said rod.

13. A control device as defined in claim 12, wherein said control member is provided with means engageable with said second armature, operative to restrict relative movement of the latter about the axis of said rod.

14. A control device as defined in claim 11, comprising in further combination, screw means on said second armature engageable with said control member for adjustment of the relationship of said second armature and said permanent magnet.

15. A control device which is to be connected to a movable member for selectively controlling the movement thereof, comprising a base member, a control member pivotally mounted on said base member for swinging action, means on said control member for connecting the same to such a movable member, an armature, a supporting arm for said armature pivotally mounted on said base member, a curved rod carried by said armature supporting arm, clutch means releasably connected with said rod, a supporting arm for said clutch means pivotally mounted on said base member, said rod extending through said control member and said clutch supporting arm, spring means extending between said control member and said armature supporting arm operative to urge the latter in separating directions, spring means extending between said control member and said clutch supporting arm operative to urge the latter toward each other, said clutch means releasably locking said clutch supporting arm to said rod, and means for selectively effectively effecting the release of said clutch means.

16. A control device as defined in claim 15, wherein said clutch release means comprises an electromagnetic structure.

17. A control device as defined in claim 15, wherein said control member, armature-supporting member, and clutch-supporting member are pivotally mounted on a common axis.

18. A control device which is to be connected to a movable member for selectively controlling the movement thereof, comprising a base member having a base portion and a transversely extending portion, a control member pivotally supported by said base portion adjacent the juncture of said base and transverse portions, means on said control member for operatively connecting the latter to such a movable member whereby said control member is movable therewith, an electromagnet having means for mounting the same on one of the portions of said base member, an arcuate rod carried by a supporting arm pivotally mounted on said base member on the pivotal axis of said control member, said rod being axially movable relative to said control member, an armature carried at one end of said rod, said rod being disposed to position said armature for operative engagement with said electromagnet, spring means operative to bias said rod supporting arm relative to said control member in a direction to bias said armature toward its magnet engaging position, permanent magnet means carried by said control member, a second armature cooperable with said permanent magnet means, a supporting arm for said premanent magnet means pivotally mounted on said base member on said common pivotal axis, and movable along said tube, clutch means operatively carried by said magnet supporting arm for releasably rigidly locking said arm to said rod, whereby said magnet supporting arm is operative to restrict movement of said rod and first armature toward said electromagnet, and means carried by said magnet supporting member, for effecting release of said clutch means to permit movement of said rod relative to said control member responsive to action of said spring, said permanent magnet and said control member being separable upon the application of separating force therebetween greater than the magnetic attraction therebetween and the action of said spring, and spring means operatively connecting said magnet supporting arm and said control member operative to urge the arm toward one another.

19. A control device as defined in claim 18 wherein said means for connecting said control member to such a movable member comprises a slotted plate carried by said control member and a pin of a size to enter said slot having means thereon for attachment to such a movable member.

20. A control device as defined in claim 18 comprising in further combination screw means on said control member engagement with a portion of said permanent magnet supporting arms for adjustment of the relationship of said permanent magnet and said control member.

21. In a control device which is to be connected to a movable member for selectively controlling the movement thereof, the combination of a control member constructed for operative connection to such a movable member whereby movement of the latter is transmitted to said control member, an element adjustably connectable with said control member, relatively stationary means releasably connectable with said element for retaining the latter in a single predetermined position in which control of said movable member may be selectively adjusted by varying the relative connected positions of said element and said control member, and releasable means for normally maintaining said element in any of its adjusted positions with respect to said control member, operative upon application of overriding force to said control member to operatively release said element with respect to said control member, said releasable means being constructed to progressively require more overriding force as the adjustment of said element relative to said control member is varied in one direction and operative to apply return forces to said element and control member upon cessation of such overriding force.

References Cited
UNITED STATES PATENTS

| | | | |
|---|---|---|---|
| 2,159,772 | 5/1939 | Schroedter | 192—3 |
| 2,528,745 | 11/1950 | Fisher | 192—3 |
| 2,916,116 | 12/1959 | Eddy et al. | 192—3 |

DONLEY J. STOCKING, *Primary Examiner.*

ARTHUR T. McKEON, *Examiner.*